United States Patent
Reinards

(10) Patent No.: US 7,398,705 B2
(45) Date of Patent: Jul. 15, 2008

(54) METHOD FOR THE CONTROL OF A GEARBOX ARRANGEMENT

(75) Inventor: Marco Reinards, Bleialf (DE)

(73) Assignee: Deere & Company, Moline, IL (US)

( * ) Notice: Subject to any disclaimer, the term of this patent is extended or adjusted under 35 U.S.C. 154(b) by 136 days.

(21) Appl. No.: 11/299,557

(22) Filed: Dec. 12, 2005

(65) Prior Publication Data
US 2007/0131047 A1    Jun. 14, 2007

(51) Int. Cl.
F16H 59/00    (2006.01)

(52) U.S. Cl. ......................................................... 74/335

(58) Field of Classification Search ................... 74/333, 74/335; 477/70; 192/3.58, 3.57
See application file for complete search history.

(56) References Cited

U.S. PATENT DOCUMENTS

| | | | | |
|---|---|---|---|---|
| 4,979,599 A | * | 12/1990 | Nishida | 192/3.58 |
| 5,035,308 A | * | 7/1991 | Baba et al. | 477/62 |
| 5,060,769 A | * | 10/1991 | Yoshimura et al. | 192/3.29 |
| 5,115,897 A | * | 5/1992 | Yoshimura et al. | 477/65 |
| 5,303,616 A | * | 4/1994 | Palansky et al. | 477/63 |
| 5,474,506 A | * | 12/1995 | Palansky et al. | 477/63 |
| 5,573,473 A | * | 11/1996 | Asayama et al. | 477/63 |
| 6,077,188 A | * | 6/2000 | Futamura et al. | 477/65 |
| 6,112,870 A | * | 9/2000 | Fukumoto | 192/3.58 |
| 6,719,657 B2 | * | 4/2004 | Nishida et al. | 475/65 |
| 7,244,215 B2 | * | 7/2007 | Reinards et al. | 477/70 |

FOREIGN PATENT DOCUMENTS

| | | |
|---|---|---|
| DE | 35 29 473 | 2/1986 |
| DE | 197 35 759 | 2/1999 |
| DE | 199 08 602 | 9/2000 |
| DE | 103 24 095 | 12/2004 |
| EP | 0 545 298 | 6/1993 |

* cited by examiner

Primary Examiner—Dirk Wright

(57) ABSTRACT

The present invention relates to a method for the control of a gearbox arrangement with which a torque generated by an engine is transmitted to a drive axle of a vehicle. The gearbox arrangement includes a power shift gearbox and a drive clutch. During a shift process of the power shift gearbox, the drive clutch is disengaged at least partially so that a remaining torque is transmitted from the engine to the drive axle at an almost unchanged operating condition of the engine.

13 Claims, 2 Drawing Sheets

METHOD FOR THE CONTROL OF A GEARBOX ARRANGEMENT

BACKGROUND

1. Field of the Invention

The present invention relates to methods for the control of a gearbox arrangement by which torque generated by an engine is transmitted to a drive axle of a vehicle which includes a power shift transmission and a reverse module.

2. Description of the Related Art

During the shifting of the power shift gearbox, a jerk during shifting can be felt. This occurs because disk clutches shifting the various gear ratios of the power shift gearbox are engaged and disengaged hydraulically without modulation. This leads to torque variations in the drive-line of the vehicle, which are felt by the operator of the vehicle as jerk-like motion, thus resulting in reduced driving comfort. To avoid the jerking during shifting, U.S. Publication 2004/0237682 proposes that the drive clutch be brought purposefully into the slip region in a controlled sequence during the power shift process and subsequently be brought into engagement in a controlled and modulated manner.

The calibration of the control process to bring the drive clutch into the slip region is costly. It must be performed individually for each gearbox arrangement of a vehicle and, in certain circumstances, during the production and installation of the power shift gearbox and the drive clutch. This may be required and is costly, particularly if various vehicle components have different configurations of a power shift gearboxes and drive clutches.

Therefore, there is a need for a cost effective solution for placing the clutch in the slip region in a controlled sequence during the power shift process without the need for calibration of the control process for each gearbox arrangement.

SUMMARY

The gearbox arrangement is provided with a power shift gearbox and a drive clutch. During a shifting of the power shift gearbox, the drive clutch is disengaged at least partially in such a way that a remaining torque is transmitted at all times from the prime mover to the drive axle at a nearly unchanged operating condition of the prime mover.

A gearbox arrangement of the aforementioned kind is known, for example from U.S. Publication 2004/0237682 A1, particularly for tractors, which is completely incorporated herein and reference is herein made to its entire disclosure.

The torque transmitted by a clutch depends on the engagement pressure with which the clutch is loaded. This is the case particularly with an electromagnetic, hydraulically actuated clutch. The shift bump caused by the shift process of the power shift gearbox is largely compensated for by a brief period of slip of the drive clutch so that the jerking during shifting almost never occurs and the driving comfort is improved. In particular, there is no need to modify the control arrangement of the engine so that problems associated with this are circumvented. The power shift gearbox can also be shifted under load through all gear ratios without completely interrupting the transmission of torque from the engine to the drive axle. By automatically initiating the disengagement process of the drive clutch, an operating error of the gearbox arrangement is largely avoided. By providing a control of the value of the slip of the drive clutch, an individual calibration of the entire gearbox arrangement during the production of the vehicle can be omitted, since during each power shift process an individual control of the value of the slip of the drive clutch is performed. During this control process, actual values are constantly compared to target values provided as an input by the control algorithm. The value of the slip of the drive clutch that can be adjusted individually or controlled correspondingly.

The method, according to the invention, may include the steps described in the following.

Fundamentally, a provision is made that upon a power shift command triggered by the operator, the slip control is activated, that is, not to shift the power shift gearbox immediately upon the shift command from the operator (time delayed shift). Thereby, the slip of the drive clutch is adjusted, preferably for a predetermined time interval, initially to a predetermined value and/or course of the value of the slip. The course of the value of the slip may be, for example, a linear or square course of the function of the value of the slip as a function of time. Very generally, it means that an analytical value is provided as input by a sequence and that values of the slip function provided as input and stored in memory in a control arrangement as a function of time.

After the slip of the drive clutch has assumed the predetermined value, the control arrangement is brought into a stable condition. During this stable condition, the value of the slip of the drive clutch is set to a constant value. Above all, conditions are to be avoided in which oscillations in the skip control occur, in which the intended goal of the reduction of the jerk during shifting.

According to a preferred step of the method, a provision is made for the power shift process to be performed when the slip of the drive clutch has assumed the predetermined value. The drive clutch has then assumed the ideal value of the slip for the shift process of the power shift gearbox, so that the conditions exist to filter out or suppress the jerk during shifting occurring on the basis of the shift process of the power shift gearbox with the aid of the slip of the drive clutch.

Alternatively or additionally, a provision could be made for the timing of the power shift process to occur after a predetermined time interval of the power shift command triggered by the operator. This could be provided as an input of a function of the gear ratio engaged at that time and the desired final gear ratio. These input values could be stored in memory in a memory unit of a control arrangement.

In order for a gentle and modulated engaging of the drive clutch to be assured, the value of the slip of the drive clutch could be reduced from the time of the start of the power shift process by a predetermined, preferably linear, course of the function. This could also be attained by limiting the value of the slip of the drive clutch in the downward and/or the upward direction starting with the time of the power shift process according to a predetermined linear function by means of the control algorithm, in order to finally avoid oscillations or individual torque variation peaks.

Moreover, a provision could be made that upon falling short of a predetermined control deviation for the value of the slip of the drive clutch, according to a predetermined linear function, the value of the slip of the drive clutch is reduced to a greater degree than immediately after the power shift process. This measure is provided shortly before the complete engagement of the drive clutch in order to prepare for the engagement of the drive clutch upon a minor deviation from the rule. With the aid of this step of the process, the duration of the entire shift process can be reduced. For example, the slope of the linear course of the function of the value of the slip of the drive clutch exhibits a "more negative" value, in a mathematical sense, and therefore the value of the slip approaches zero more rapidly.

A determination of the actual existing value of the slip could be made by comparing the input rotational speed of the drive clutch with the output rotational speed of the drive clutch. The input rotational speed of the drive clutch could be determined, for example, by the fact that the rotational speed of the drive shaft is known on the basis of the control data of the engine or by a rotational speed sensor provided on the engine. If the drive clutch is arranged so as to follow immediately upon the engine, then the input rotational speed of the drive clutch is known from the rotational speed of the drive shaft. In case that the power shift clutch is arranged between the engine and the drive clutch, then the input rotational speed of the drive clutch can be calculated by using the rotational speed of the drive shaft and the gear ratio of the power shift gearbox for the actual gear ratio engaged. The output rotational speed of the drive clutch could be determined, for example, by using a further rotational speed sensor that is arranged either on the output shaft of the drive clutch and/or on the drive wheel of the vehicle.

In a preferred step, the value of the slip that can be provided as input and/or a function for the reduction of the slip of the drive clutch and can be selected as a function of the load applied to the gearbox. In that way, a high load, the maximum value of the slip of the drive clutch that can be adjusted during a shift process is to be selected at a higher level than could be the case at a low load.

In the method, for the control of a gearbox arrangement, at least one point in time could be provided for the value of the slip of the drive clutch to be controlled with respect to time. This is provided, for example, immediately after the issuance of the power shift command triggered by the operator and after the adjustment of the value of the slip to a predetermined value.

Besides a manual actuation of the drive clutch by the operator, particularly during the shifting of the shift gearbox, the drive clutch can also be actuated electro-hydraulically or magneto-hydraulically. The drive clutch could preferably be actuated by means of a proportional pressure control valve. A manual actuation of the drive clutch of a vehicle is usually performed by means of a clutch pedal and is actuated by the operator of a vehicle configured as a tractor during the shifting of the group shift gearbox. An electro-hydraulic or magneto-hydraulic actuation of the drive clutch of a vehicle is provided in the case of a tractor in addition to the manual actuation of the drive clutch, particularly in order to purposefully control the partial disengaging of the drive clutch during the shift process of the power shift gearbox.

The control strategy could also be calculated with a control unit. Preferably, the control unit is provided with a memory arrangement in which the value of the slips that can be provided as an input, the value of the slips and/or time interval values are stored in memory and will be provided as input for the control of the power shift process. The control unit could be configured in the form of a computer board (or card) equipped with corresponding electronic components.

Another provision may be made for a predetermined minimum torque to be transmitted by the drive clutch during the shift process of the power shift gearbox. The minimum torque, for example, could amount to 10% to 40% of the maximum torque transmitted. This minimum torque could be calculated as a function of the immediate condition of the gearbox arrangement or of the vehicle.

These and other aspects and advantages of the present invention will become apparent upon reading the following detailed description of the invention in combination with the accompanying drawings.

DETAILED DESCRIPTION

Figure 1:
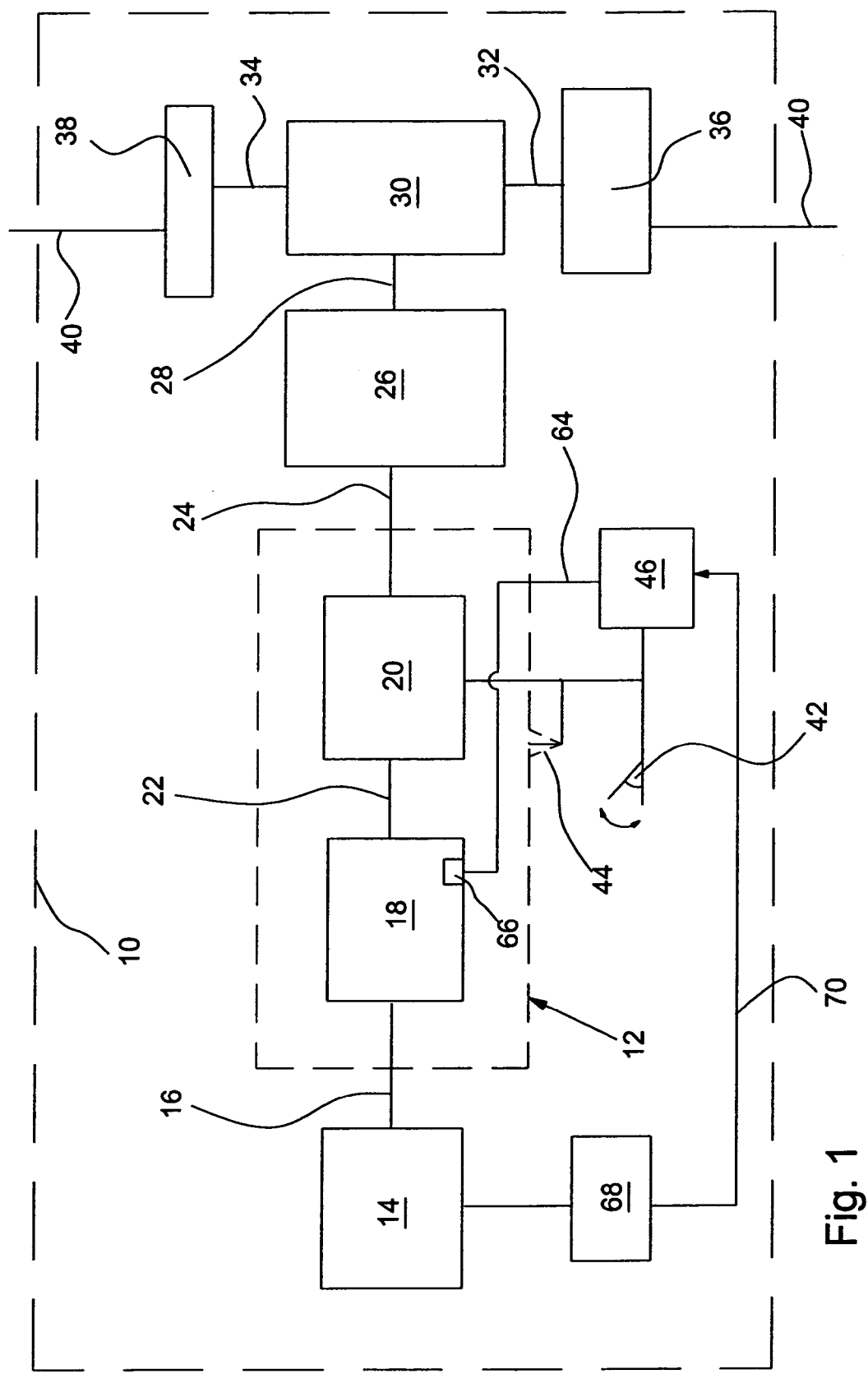
FIG. 1 is a schematic illustration of a vehicle embodying the principles of the present invention.

FIG. 1 shows a vehicle 10 configured in the form of a tractor with a gearbox arrangement 12 according to the invention. The vehicle 10 is driven by a prime mover 14 configured as an internal combustion engine. The torque generated by the engine 14 is initially transmitted to the gearbox arrangement 12 by means of the shaft 16. The gearbox arrangement 12 includes a power shift gearbox 18 and a drive clutch 20 (with a reverse gear ratio) that are connected to each other by means of the shaft 22. The gearbox arrangement 12 is followed by the shaft 24 with a gearbox 26, a so-called group shift gearbox, with which larger speed ranges can be shifted. The shift gearbox 26 is shifted during the actuation of the drive clutch 20, in particular by manual actuation by an operator (not shown in FIG. 1).

The torque carried by the shift gearbox 26 is transmitted to a differential gearbox 30 by means of a shaft 28. The differential gearbox 30 transmits the torque to a pair of axle gearboxes 36, 38 by means of the shafts 32, 34, respectively. For their part, the axle gearboxes 36, 38 pass along the torque to the drive axle 40 of the vehicle 10.

FIG. 1 indicates schematically that the drive clutch 20 can be triggered or actuated by the operator by means of a clutch pedal 42 or the operating direction lever 44. Alternatively, the drive clutch 20 can be actuated magneto-hydraulically by a corresponding control signal from a control unit 46. Signals representing the positional status of the pedal or lever 44 are communicated to the control unit 46.

During a shift process of the power shift gearbox 18, the drive clutch 20 is automatically at least partly disengaged, at an almost unchanged operating condition of the engine 14, whereby a remaining torque is transmitted at all times from the engine 14 to the drive axle 40.

Figure 2:
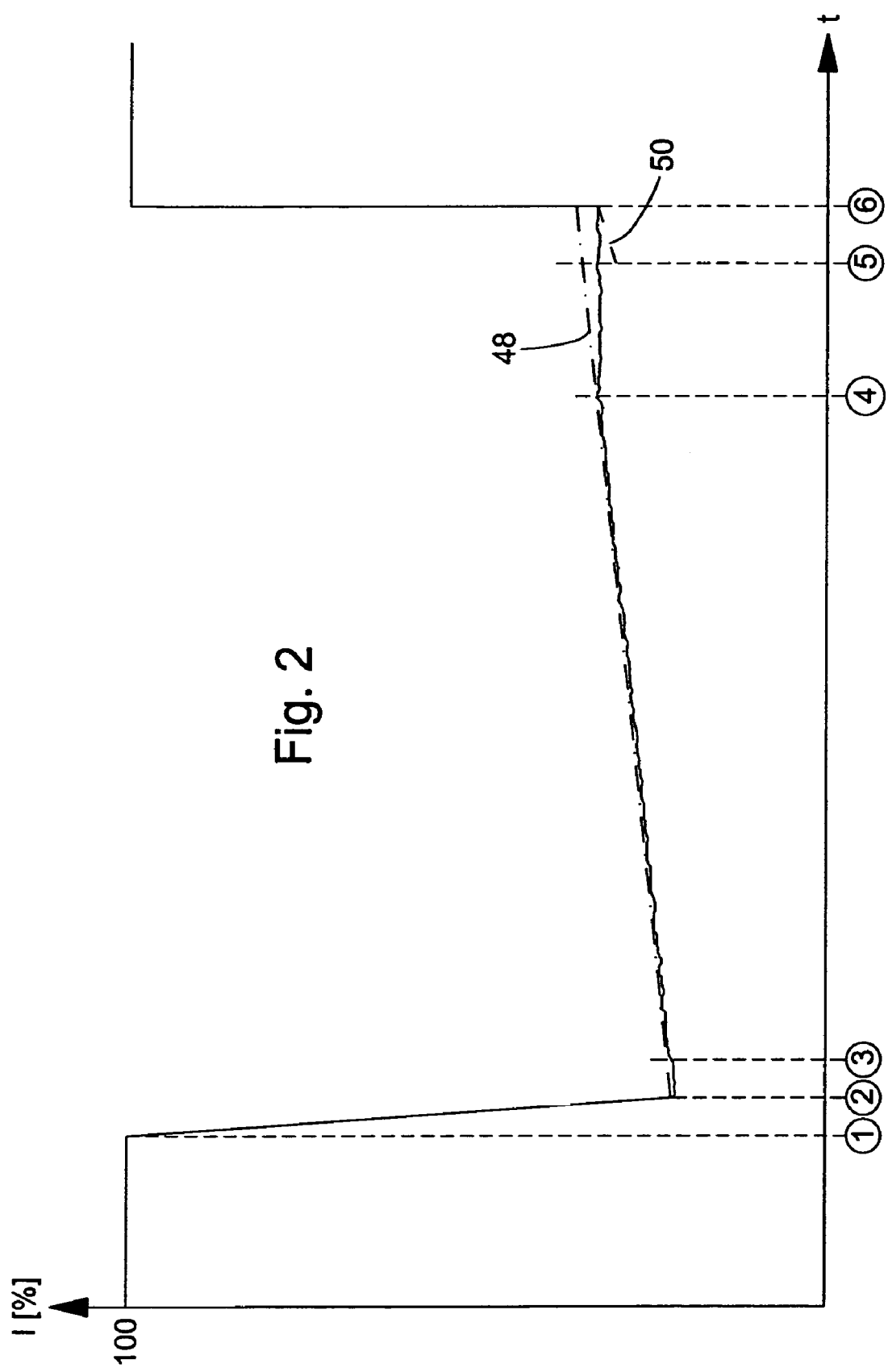
FIG. 2 is a diagrammatic illustration of the electric current of a magnetic coil of a proportional valve as a function of time in accordance with the principles of the present invention.

FIG. 2 shows a schematic diagram of the electric current (I) with which the magnetic coil of a proportional pressure control valve (not shown) is loaded as a function of time (t). The oil pressure for the disengagement of the drive clutch 20, in a continuous motion, is a function of the electric current I. Principally, the value of the slip in the drive clutch 20 is a function of the current as reflected along the t-axis, where the value of the slip is equal to zero when I=100.

At the time t=1 the power shift command is triggered, in particular by the manual actuation of a switch, not shown in the figures, or by an automatic switch function. Thereupon, the slip control of the drive clutch 20 is activated and the oil pressure in the drive clutch 20 is lowered by reducing the electric current (I) to such a point that the drive clutch 20 slips at a predetermined slip value. This operating point is reached in the diagram, according to FIG. 2, at the time t=2. The time interval t=2 through t=3 is used to establish a stable condition of the control and to perform the mechanical shift process in the power shift gearbox 18. The actual time of the shift is established by a time constant. With regard to this, a time counter associated with the control unit 46 starts at time t=1 and hence with a time delay from the shift command.

As a result of the shift process during the time interval from t=2 to t=3, the difference in rotational speed between the input to the drive clutch and the output from the drive clutch increases on the basis of the change in speed ratio and the torque to be transmitted.

The electric current (I) and the oil pressure in the drive clutch 20 is again increased by the control arrangement, in order to equalize the control difference between the target value and the actual value of the slip. During the phase from time interval t=3 to t=4, the current increase is limited by an upper limiting line 48 in order to assure a gentle and modulated engagement of the drive clutch 20. The slope of the limiting line 48 is provided as a fixed input or is a function of the torque to be transmitted by the drive clutch 20 that can be determined during the time interval t=2 to t=3. Accordingly, a provision is made that the higher the torque to be transmitted, the steeper the slope of the selected limiting line 48 will be.

At the time t=4, the control arrangement reaches the target operating point at which the control deviation has not reached a predetermined threshold. After a brief control phase in the target operating point (time interval t=4 to t=5), the electric current I is raised further by a lower limiting line 50. Thereby, the drive clutch 20 is fully engaged and the current target value calculated by the slip control is overwritten or exceeded. This engagement process takes place in the time interval t=5 to t=6. At the time t=6 the drive clutch 20 is now completely engaged. As a resulting reaction, the electric current (I) is again raised to the maximum adjusted value and the shift process is thereby completed.

The value of the electric current shown in FIG. 2 upon which the value of the slip of the drive clutch 20 is dependent, is controlled by the control unit 46 shown in FIG. 1. For this purpose, the control unit 46 is supplied over the connecting line 64 with the actual existing operating condition of the power shift gearbox 18, which is issued by the control unit 66 of the power shift gearbox 18. Moreover, the actual existing condition of the engine 14 is supplied from its control unit 68 to the control unit 46 of the drive clutch 20 by way of the connecting line 70. The calculation of the control strategy includes the value of the electric current (I) or the value of the valve current, as well as the actual existing load utilization on the engine 14, whereby it is assurance that at high load on the vehicle there is no unpleasant delay in the shift process.

Although the invention has been described in terms of only one embodiment, anyone skilled in the art will perceive many varied alternatives, modifications and variations in the light of the foregoing description and the drawing, all of which fall under the present invention.

The foregoing disclosure is the best mode devised by the inventor for practicing this invention. It is apparent, however, that methods incorporating modifications and variations will be obvious to one skilled in the art of motor vehicle clutches and lubrication thereof. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A method for the control of a gearbox arrangement wherein a torque generated by a prime mover is transmitted to a drive axle of a vehicle, the method comprising the steps of:
    providing a gearbox arrangement having a power shift gearbox and a drive clutch;
    during shifting of the power shift gearbox, partially disengaging the drive clutch with minimum effect on the operating condition of the engine;
    utilizing a control algorithm during each power shift process to provide a control of the value of the slip of the drive clutch;
    transmitting a remaining torque from the engine to the drive axle so that the value of the slip of the drive clutch is such that jerk during shifting is minimized.

2. The method according to claim 1, further comprising the step of adjusting the slip of the drive clutch to a predetermined value.

3. The method according to claim 2, further comprising the step of bringing the drive clutch to a constant value after the slip of the drive clutch has assumed the predetermined value.

4. The method according to claim 2, wherein the method is performed when the slip of the drive clutch has been adjusted to the predetermined value.

5. The method according to claim 1, wherein the method is performed during a predetermined time interval following a power shift command triggered by an operator.

6. The method according to claim 5, further comprising the step of reducing the value of the slip of the drive clutch according to a predetermined function.

7. The method according to claim 4, further comprising the step of limiting the value of the slip of the drive clutch according to a function.

8. The method according to claim 1, further comprising the step of reducing the value of the slip of the drive clutch by a greater amount when a predetermined variation of the control for the value of the slip falls short according to a predetermined course of the function.

9. The method according to claim 1, further comprising the step of determining of the actual existing value of the slip by a comparison of an input rotational speed of the drive clutch and an output rotational speed of the drive clutch.

10. The method according to claim 1, further comprising the step of selecting at least one of a predetermined value of the slip and a predetermined function for the reduction of the value of the slip as a function of a load applied to the gearbox arrangement.

11. The method according to claim 1, wherein the value of the slip of the drive clutch is a constant value.

12. The method according to claim 1, further comprising the step of actuating the drive clutch by one of a proportional pressure control valve, electro-hydraulically and magneto-hydraulically.

13. The method according to claim 1, further comprising the step of transmitting a predetermined minimum torque to the drive clutch.

* * * * *